(12) United States Patent
Matsuoka et al.

(10) Patent No.: US 9,800,099 B2
(45) Date of Patent: Oct. 24, 2017

(54) SYNCHRONOUS MOTOR

(71) Applicants: Atsushi Matsuoka, Tokyo (JP); Kazuhiko Baba, Tokyo (JP); Hiroki Aso, Tokyo (JP); Yuto Urabe, Tokyo (JP)

(72) Inventors: Atsushi Matsuoka, Tokyo (JP); Kazuhiko Baba, Tokyo (JP); Hiroki Aso, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 14/655,766

(22) PCT Filed: Jan. 24, 2013

(86) PCT No.: PCT/JP2013/051421
§ 371 (c)(1),
(2) Date: Jun. 26, 2015

(87) PCT Pub. No.: WO2014/115278
PCT Pub. Date: Jul. 31, 2014

(65) Prior Publication Data
US 2016/0006301 A1     Jan. 7, 2016

(51) Int. Cl.
*H02K 1/14*     (2006.01)
*H02K 21/16*    (2006.01)
*H02K 3/28*     (2006.01)

(52) U.S. Cl.
CPC ............. *H02K 1/146* (2013.01); *H02K 3/28* (2013.01); *H02K 21/16* (2013.01); *H02K 2213/03* (2013.01)

(58) Field of Classification Search
CPC .......... H02K 1/146; H02K 3/28; H02K 21/16; H02K 2213/03
See application file for complete search history.

(56) References Cited

U.S. PATENT DOCUMENTS 5,396,134 A  3/1995 Mochizuki
5,536,986 A  7/1996 Fukuyama et al.
(Continued)

FOREIGN PATENT DOCUMENTS

CN  1574546 A     2/2005
JP  S62-110468 A  5/1987
(Continued)

OTHER PUBLICATIONS

Office Action dated Mar. 15, 2016 issued in corresponding JP patent application No. 2014-558363 (and partial English translation).
(Continued)

*Primary Examiner* — Ramon M Barrera
(74) *Attorney, Agent, or Firm* — Posz Law Group, PLC

(57) ABSTRACT

A synchronous motor is configured such that a rotor, in which permanent magnets having poles are provided at an equiangular interval in a circumferential direction, with magnetic poles with different polarities being alternately provided, is provided to face a stator, in which nine teeth are formed at an equiangular interval in a circumferential direction, and the tip width of the central tooth of each phase among the teeth of each phase grouped into three phases with each phase including three adjacent teeth is larger than 32° and smaller than 40°.

4 Claims, 4 Drawing Sheets

(56) References Cited

U.S. PATENT DOCUMENTS

| | | |
|---|---|---|
| 5,698,915 A | 12/1997 | Fukuyama et al. |
| 2004/0245881 A1 | 12/2004 | Kadoya et al. |
| 2004/0251763 A1 | 12/2004 | Tamaki et al. |
| 2005/0029890 A1 | 2/2005 | Kadoya et al. |
| 2006/0197399 A1 | 9/2006 | Kataoka et al. |

FOREIGN PATENT DOCUMENTS

| | | |
|---|---|---|
| JP | S63-144749 A | 6/1988 |
| JP | H02-084043 A | 3/1990 |
| JP | H05-207692 A | 8/1993 |
| JP | H09-172762 A | 6/1997 |
| JP | 2000-253602 A | 9/2000 |
| JP | 2001-245460 A | 9/2001 |
| JP | 2004-215483 A | 7/2004 |
| JP | 2005-102475 A | 4/2005 |
| JP | 2006-191789 A | 7/2006 |
| JP | 2007-259541 A | 10/2007 |

OTHER PUBLICATIONS

Office Action dated Nov. 2, 2016 issued in corresponding CN patent application No. 201380068813.8 (and partia English translation).

International Search Report of the International Searching Authority dated Apr. 2, 2013 for the corresponding international application No. PCT/JP2013/051421 (and English translation).

Extended European Search Report dated Nov. 10, 2016 issued in corresponding EP patent application No. 13872806.8.

Ahmad, Mohd Saufi et al., "Permanent Magnet Brushless Machines with Minimum Difference in Slot Number and Pole Number", 2nd IEEE International Conference on Power and Energy, Dec. 1-3, 2008, Johor Baharu, Malaysia.

FIG.5

| TIP WIDTH OF TEETH [deg] | | PHASE DIFFER- ENCE θd | SHORT-PITCH WINDING FACTOR | | DISTRIBUTED WINDING FACTOR | | WINDING FACTOR | | |
|---|---|---|---|---|---|---|---|---|---|
| θ1 | θ2 | | Kp1 | Kp2 | Kd1 | Kd2 | Kw1 | Kw2 | Kw |
| 45.0 | 37.5 | 26.3 | 0.924 | 0.998 | 1 | 0.897 | 0.924 | 0.895 | 0.9046 |
| 43.0 | 38.5 | 23.8 | 0.954 | 0.994 | 1 | 0.915 | 0.954 | 0.910 | 0.9245 |
| 41.0 | 39.5 | 21.3 | 0.976 | 0.988 | 1 | 0.932 | 0.976 | 0.921 | 0.9395 |
| 40.0 | 40.0 | 20.0 | 0.985 | 0.985 | 1 | 0.940 | 0.985 | 0.925 | 0.9452 |
| 39.0 | 40.5 | 18.8 | 0.991 | 0.981 | 1 | 0.947 | 0.991 | 0.929 | 0.9496 |
| 38.0 | 41.0 | 17.5 | 0.996 | 0.976 | 1 | 0.954 | 0.996 | 0.931 | 0.9528 |
| 37.0 | 41.5 | 16.3 | 0.999 | 0.971 | 1 | 0.960 | 0.999 | 0.933 | 0.9547 |
| 36.0 | 42.0 | 15.0 | 1.000 | 0.966 | 1 | 0.966 | 1.000 | 0.933 | 0.9553 |
| 35.0 | 42.5 | 13.8 | 0.999 | 0.960 | 1 | 0.971 | 0.999 | 0.933 | 0.9547 |
| 34.0 | 43.0 | 12.5 | 0.996 | 0.954 | 1 | 0.976 | 0.996 | 0.931 | 0.9528 |
| 32.0 | 44.0 | 10.0 | 0.985 | 0.940 | 1 | 0.985 | 0.985 | 0.925 | 0.9452 |
| 30.0 | 45.0 | 7.5 | 0.966 | 0.924 | 1 | 0.991 | 0.966 | 0.916 | 0.9326 |

SYNCHRONOUS MOTOR

CROSS REFERENCE TO RELATED APPLICATION

This application is a U.S. national stage application of International Patent Application No. PCT/JP2013/051421 filed on Jan. 24, 2013, the disclosure of which is incorporated herein by reference.

TECHNICAL FIELD

The present invention relates to a synchronous motor.

BACKGROUND

In a three-phase synchronous motor using permanent magnets, generally, in a motor in which stator windings are wound intensively around teeth, the ratio between the number of magnetic poles of permanent magnets to be used in a rotor and the number of slots (=the number of teeth) of a stator is often 2:3. On the other hand, there is known a synchronous motor using a combination of the number of magnetic poles of permanent magnets and the number of slots that can cause the magnetic flux generated by the permanent magnets to interlink stator windings more effectively (for example, Patent Literatures 1 and 2).

Furthermore, as a technique for causing the magnetic flux generated by permanent magnets of a rotor to interlink stator windings more effectively, there is known a technique in which the arrangement of the teeth around which the stator windings are wound is made non-uniform according to the combination of the number of magnetic poles and the number of slots without making the arrangement uniform (for example, Patent Literatures 3 to 5).

PATENT LITERATURES

Patent Literature 1: Japanese Patent Application Laid-open No. S62-110468
Patent Literature 2: Japanese Patent Application Laid-open No. H9-172762
Patent Literature 3: Japanese Patent Application Laid-open No. 2000-253602
Patent Literature 4: Japanese Patent Application Laid-open No. 2005-102475
Patent Literature 5: Japanese Patent Application Laid-open No. H2-84043

However, according to the techniques disclosed in Patent Literatures 3 to 5 listed above, the arrangement of the portions of the teeth around which windings are wound also becomes non-uniform; therefore, the sectional area of the slot that accommodates therein the windings becomes non-uniform and the maximum amount of windings that can be wound is limited by the slot having a narrow sectional area. Accordingly, the sectional area of the stator of the electric motor cannot be utilized effectively.

For example, in a case of the 8-pole 9-slot three-phase DC motor described in Patent Literature 3, the width of the central tooth among the three adjacent teeth of each phase is increased and the number of windings to be wound around the central tooth is increased in some cases, thereby enabling the performance of the synchronous motor to be advanced. Therefore, the non-uniformity of the sectional area of the slot can be effectively used. However, the 10-pole 9-slot synchronous motor described in Patent Literature 4 has a configuration in which the portions of the teeth at both ends around which the windings are wound are arranged close to the center. Therefore, the number of windings wound around the central tooth cannot be increased and thus the sectional area of the stator cannot be effectively used. Further, Patent Literature 4 does not disclose the specific range and the reasons of the effects acquired by making the arrangement of the teeth non-uniform.

Further, for example, in a case of the 8-pole 9-slot motor described in Patent Literature 5, unlike the technique disclosed in Patent Literature 3, it is described that the width of two teeth among three teeth constituting one phase is increased to enable effective utilization of the magnetic flux of the permanent magnets of the rotor. However, for example, if the width of the teeth at both ends of the teeth constituting one phase is increased, the number of windings wound around the central tooth cannot be increased; therefore, the magnetic flux of the rotor cannot be acquired effectively.

SUMMARY

The present invention has been achieved in view of the above problems, and an object of the present invention is to provide a synchronous motor that can achieve high output and high efficiency and can realize high performance in a 10-pole 9-slot synchronous motor.

In order to solve the above problems and achieve the object, a synchronous motor according to an aspect of the present invention including: a stator in which nine teeth are formed on an annular iron core centering on a shaft center at an equiangular interval in a circumferential direction, the teeth extending toward the shaft center; and a rotor in which pole-oriented permanent magnets having 10 poles are provided on an outer periphery centering on the shaft center at an equiangular interval in a circumferential direction, with magnetic poles with different polarities being alternately provided, the rotor being arranged to face the stator, wherein the teeth are grouped into three phases, with each phase including three adjacent teeth, stator windings are wound continuously in a concentrated manner around the teeth for one phase, with winding directions of the stator windings of each phase being opposite to each other between adjacent teeth as viewed from the shaft center, and a width of a tip portion of a central tooth, which face the rotor, among the teeth of each phase is larger than 32° and smaller than 40°.

According to the present invention, in a 10-pole 9-slot synchronous motor, an effect is obtained where high output and high efficiency can be achieved and high performance can be realized.

BRIEF DESCRIPTION OF DRAWINGS

FIG. 5 is a diagram illustrating the results of calculation for obtaining a short-pitch winding factor Kp, a distributed winding factor Kd, and a winding factor Kw, using tip widths θ1 and θ2 of the teeth of each phase as parameters.

DETAILED DESCRIPTION

A synchronous motor according to embodiments of the present invention will be explained below with reference to the accompanying drawings. The present invention is not limited to the embodiments.

Embodiment

Figure 1:
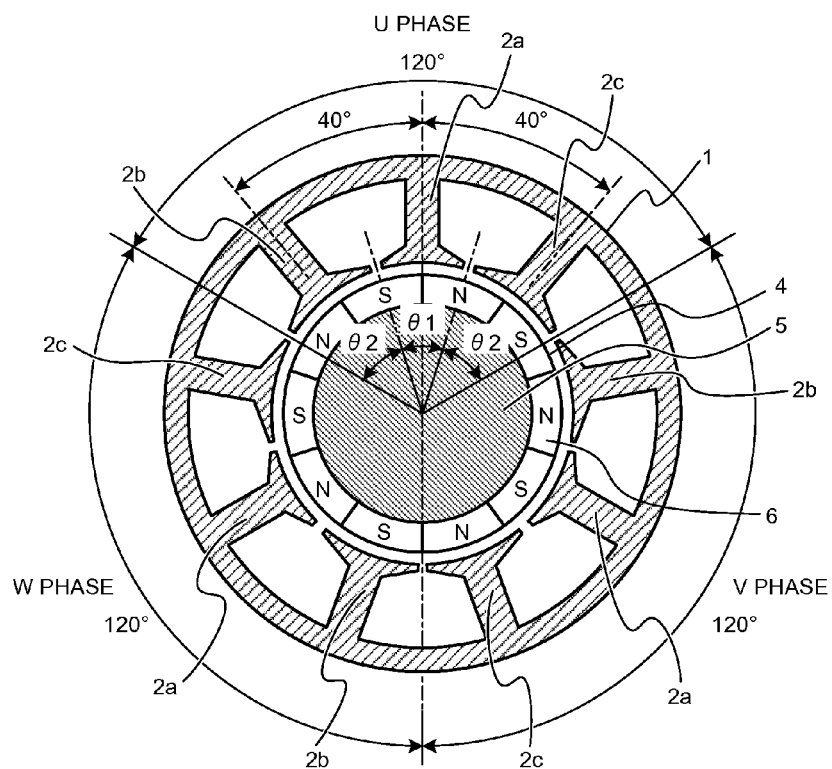
FIG. 1 is a transverse cross-sectional view of a synchronous motor according to an embodiment.

FIG. 1 is a transverse cross-sectional view of a synchronous motor according to an embodiment. As illustrated in FIG. 1, in the present embodiment, an explanation will be given of an example of a synchronous motor that uses a rotor 4, in which permanent magnets are positioned to face the inner periphery of a stator 1.

In the stator 1, nine projecting iron cores (hereinafter, "teeth") 2a, 2b, and 2c are formed on the annular iron core centering on the shaft center at equiangular intervals (a mechanical angle of 40°) in the circumferential direction, extending toward the shaft center. The teeth 2a, 2b, and 2c are grouped into three phases (a U phase, a V phase, a W phase), with each phase including three adjacent teeth. The width of the portion of each of the teeth 2a, 2b, and 2c facing the rotor 4 is hereinafter referred to as a "tip width".

In the rotor 4, permanent magnets 6 having 10-poles are provided on the outer periphery of a columnar back yoke 5 centering on the shaft center, at equiangular intervals (a mechanical angle of 36°) in the circumferential direction, with magnetic poles with different polarities being alternately provided. The rotor 4 is provided rotatably on the inner side of the teeth 2a, 2b, and 2c such that it faces the stator 1.

Figure 2:
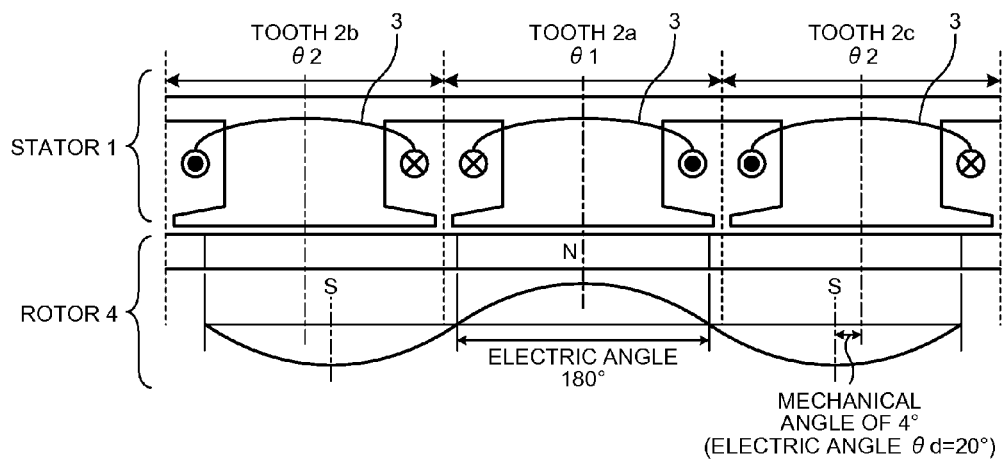
FIG. 2 is a diagram illustrating a positional relation between teeth for one phase and magnetic poles of the synchronous motor according to the embodiment.

FIG. 2 is a diagram illustrating a positional relation between teeth for one phase and magnetic poles of the synchronous motor according to the embodiment. Stator windings 3 of each of the phases are wound continuously in a concentrated manner around the respective teeth 2a, 2b, and 2c for one phase, with the winding directions of the stator windings 3 wound around the adjacent teeth of each phase being opposite to each other as viewed from the shaft center.

As illustrated in FIG. 2, if it is assumed that the center of the central tooth 2a of each phase corresponds to the center of the permanent magnet 6 opposite thereto, i.e., the center of the magnetic pole, the centers of the teeth 2b and 2c at both ends of each phase are at positions shifted from the center of the permanent magnets 6 opposite thereto, i.e., the center of the magnetic poles by an electric angle θd=20' (a mechanical angle of 4'). In the present embodiment, as illustrated in FIG. 1 and FIG. 2, it is also assumed that the tip width of the tooth 2a positioned at the center for each phase is θ1 and the tip width of the teeth 2b and 2c positioned at both ends of each phase is θ2.

Figure 3:
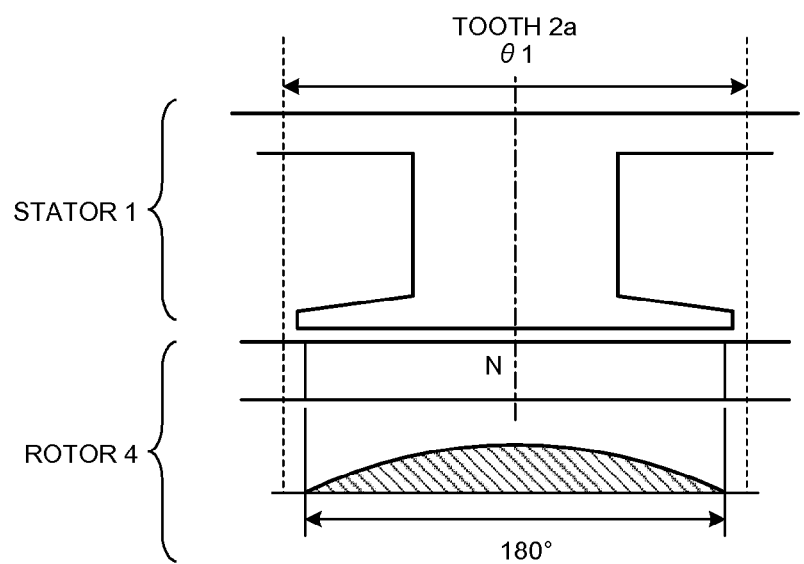
FIG. 3 is a diagram illustrating an example in which the center of a tooth and the center of a magnetic pole match each other.
Figure 4:
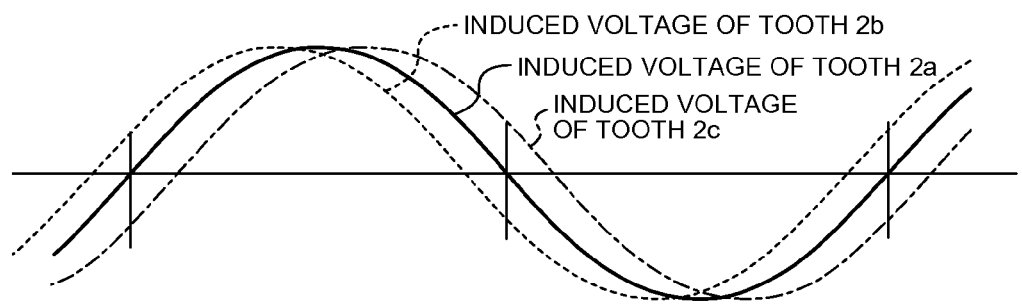
FIG. 4 is a diagram illustrating the induced voltages of stator windings wound around teeth for one phase.

The concept of the configuration of the present embodiment is described here with reference to FIG. 2 to FIG. 4. FIG. 3 is a diagram illustrating an example in which the center of a tooth and the center of a magnetic pole match each other. FIG. 4 is a diagram illustrating the induced voltages of the stator windings wound around the teeth for one phase.

As an index indicating how effectively the magnetic flux generated by permanent magnets of a rotor interlinks stator windings, there is a factor generally referred to as a "winding factor Kw". The winding factor Kw is a product of a short-pitch winding factor Kp and a distributed winding factor Kd.

The short-pitch winding factor Kp is calculated on the basis of the width of a magnetic pole of a rotor and the tip width of a tooth of a stator. The short-pitch winding factor Kp is a factor that indicates how much magnetic flux passes through the teeth around which stator windings are wound, assuming that the magnetic flux is generated sinusoidally from one magnetic pole of the rotor. The short-pitch winding factor Kp is calculated on the basis of the width (an angle) of one magnetic pole of the rotor and the tip width (an angle) of a tooth by using the following equation (1).

$$Kp = \sin(\pi/2 \times (\text{number of poles})/(\text{number of slots})) = \\ \sin(\pi/2 \times (\text{tip width of tooth})/(\text{width of magnetic pole})) \quad (1)$$

From the above equation (1), it is understood that, if the tip width of the tooth and the width of the magnetic pole are equal to each other, the short-pitch winding factor Kp becomes 1, which is the maximum value. As illustrated in FIG. 3, if the tip width of the tooth is large, a part of the magnetic flux passing through the tooth does not interlink the stator winding and passes through the tip portion of the tooth, and is shunted to an adjacent magnetic pole. Therefore, the short-pitch winding factor Kp decreases. In contrast, even if the tip width of the tooth is smaller than the width of the magnetic pole, not all the magnetic flux generated from the magnetic pole can interlink the stator winding. Therefore, the short-pitch winding factor Kp decreases.

Meanwhile, if the phases of the induced voltages generated in the respective stator windings wound around the teeth of the same phase are shifted from each other, the distributed winding factor Kd is used for correcting the state where the amplitude of the induced voltage does not simply become the sum of the induced voltages of the respective stator windings, and the distributed winding factor Kd is generally calculated by using the following equation (2).

$$Kd = \sin(\pi/6)/(q \times \sin(\pi/6/q))$$

$$(q = (\text{number of slots})/(\text{number of poles})/3) \quad (2)$$

When q is an irreducible fraction, the value of the numerator is used.

When the ratio between the number of poles and the number of slots is a combination such as 2:3 or 4:3, which is generally used in a synchronous motor, even if the number of poles and the number of slots are increased, in the positional relation between the stator windings and the magnetic poles of each phase, only the number of repetitions of the same arrangement increases and the phases of the induced voltages generated in the respective stator windings constituting each phase are not shifted from each other. Therefore, the distributed winding factor Kd becomes 1.

In this example, the distributed winding factor Kd obtained according to the above equation (2) is a factor that is calculated while assuming a case where stator teeth are provided at regular intervals and the tip widths of all the teeth are the same. Therefore, if the teeth are not placed at regular intervals or there is a tooth having a different tip width, the winding factor Kw cannot be calculated by using the above equation (2).

Therefore, according to the present embodiment, the winding factor Kw of the synchronous motor when the tip widths of the teeth are not at regular intervals is calculated, while focusing on the magnitude of the induced voltage (=the short-pitch winding factor Kp) generated in the stator winding wound around each tooth and the phase difference (≅the distributed winding factor Kd) between the induced voltages generated in the stator windings wound around the respective teeth of each phase.

In the case of the 10-pole 9-slot synchronous motor according to the present embodiment, in the example illustrated in FIG. 2, if it is assumed that each magnetic pole of the rotor 4 moves from right to left, in the induced voltages respectively generated in the stator windings wound around the teeth 2a, 2b, and 2c, as illustrated in FIG. 4, each of the phases of the induced voltages generated in the windings wound around the teeth 2b and 2c at both ends of each phase is shifted by the electric angle of 40° with respect to the induced voltage generated in the stator winding 3 wound around the central tooth 2a of each phase. The sum of the induced voltages generated in the stator windings 3 wound around the respective teeth 2a, 2b, and 2c becomes smaller than the value obtained by multiplying the induced voltage generated in the central tooth 2a by three because of the influence of the shift of the phases of the induced voltages generated in the stator windings 3 wound around the respective teeth 2a, 2b, and 2c. For convenience sake, if the distributed winding factor Kd of each of the teeth 2a, 2b, and 2c corresponding to the above equation (2) is assumed, as a factor indicating the influence of a decrease of the induced voltage for each phase due to the shift of the phases of the induced voltages generated in the stator windings 3 wound around the respective teeth 2b and 2c at both ends of each phase, with respect to the induced voltage generated in the stator winding 3 wound around the central tooth 2a of each phase, the distributed winding factor Kd can be calculated by using the following equation (3).

$$Kd = \cos(\pi \times \theta d/180°) \quad (3)$$

In the above equation (3), θd denotes a phase difference between the phases of the induced voltages generated in the stator windings 3 wound around the teeth 2b and 2c at both ends of each phase and the phase of the induced voltage generated in the stator winding 3 wound around the central tooth 2a of each phase. As indicated in the above equation (3), as the phase difference between the induced voltage generated in the stator winding 3 wound around the central tooth 2a of each phase and the induced voltages generated in the stator windings 3 wound around the respective teeth 2b and 2c at both ends of each phase approaches 180°, the induced voltages generated in the stator windings 3 wound around the respective teeth 2b and 2c at both ends of each phase decrease, and the value obtained by combining the induced voltages generated in the stator windings 3 wound around the respective teeth 2a, 2b, and 2c also decreases.

The winding factor Kw of the 10-pole 9-slot synchronous motor according to the embodiment is obtained as described below.

In the example illustrated in FIG. 2, a winding factor Kw1 of the stator winding 3 wound around the central tooth 2a of each phase is as described below according to the equation (1) and the equation (3), where it is assumed that the short-pitch winding factor is Kp1 and the distributed winding factor is Kd1.

$$Kp1 = \sin(2\pi \times (\text{tip width of tooth } 2a)/(\text{width of magnetic pole})) =$$
$$\sin(2\pi \times \theta 1/36°)$$
$$Kd1 = \cos(\pi \times 0°/180°) = 1$$
$$Kw1 = Kp1 \times Kd1 = Kp1 = \sin(2\pi \times \theta 1/36°)$$

Furthermore, in the example illustrated in FIG. 2, a winding factor Kw2 of the stator windings 3 wound around the respective teeth 2b and 2c at both ends of each phase is as described below according to the equation (1) and the equation (3), where it is assumed that the short-pitch winding factor is Kp2 and the distributed winding factor is Kd2.

$$Kp2 = \sin(2\pi \times (\text{tip width of teeth } 2b, 2c)/(\text{width of magnetic pole})) =$$
$$\sin(2\pi \times ((120° - \theta 1)/2)/36°) = \sin(2\pi \times (60° - \theta 1/2)/36°)$$
$$Kd2 = \cos(\pi \times ((\theta 1/2 + \theta 2/2) \times (\text{number of pole pairs}) - 180°)/180°) =$$
$$\cos(\pi \times (30° - \theta 1/4)/180°)$$
$$Kw2 = Kp2 \times Kd2 =$$
$$(\sin(2\pi \times (60° - \theta 1/2)/36°) \times \cos(\pi \times (30° - \theta 1/4)/180°))$$

From the above equations, the winding factor Kw for each phase can be obtained according to the following equation (4).

$$Kw = (Kw1 + 2Kw2)/3 = (\sin(2\pi \times \theta 1/36°) + \quad (4)$$
$$2(\sin(2\pi \times (60° - \theta 1/2)/36°) \times \cos(\pi \times (30° - \theta 1/4)/180°)))/3$$

Figure 6:
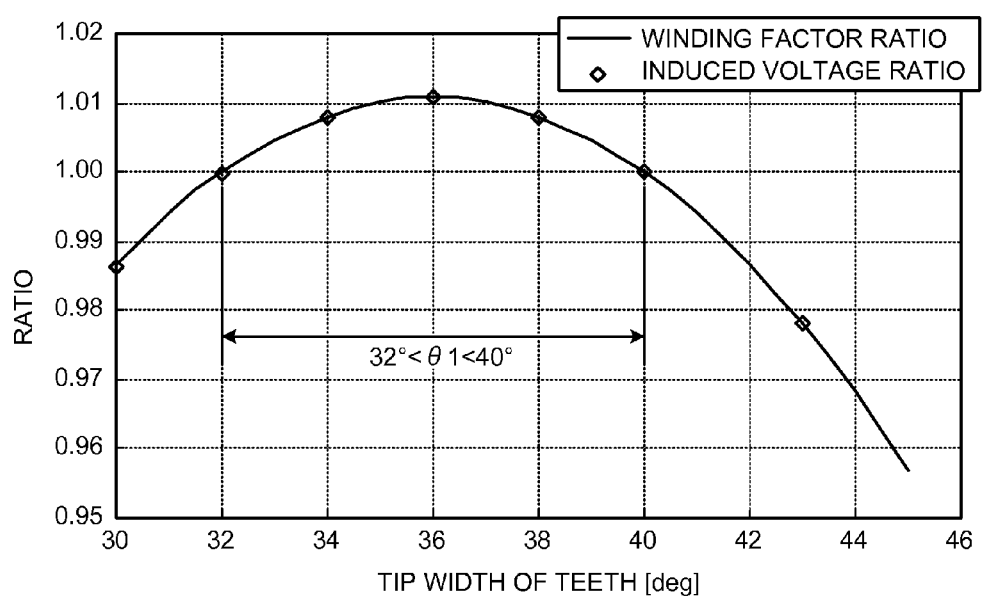
FIG. 6 is a diagram illustrating the winding factor ratio and the induced voltage ratio with reference to a case where the tip width θ1 of the central tooth of each phase is 40°.

FIG. 5 is a diagram illustrating the results of calculation for obtaining the short-pitch winding factor Kp, the distributed winding factor Kd, and the winding factor Kw, using the tip widths θ1 and θ2 of the teeth of each phase as parameters. FIG. 6 is a diagram illustrating the winding factor ratio and the induced voltage ratio with reference to a case where the tip width θ1 of the central tooth of each phase is 40°. The solid line illustrated in FIG. 6 indicates the winding factor ratio with reference to the winding factor Kw when the winding factor Kw is obtained by using the above equation (4) and the tip width θ1 of the central tooth of each phase is 40°. The rhombic sign (◇) illustrated in FIG. 6 indicates the induced voltage ratio with reference to the induced voltage when the induced voltage of a 10-pole 9-slot synchronous motor having a different tip width of the central tooth of each phase is obtained by magnetic field analysis and the tip width θ1 of the central tooth of each phase is 40°.

In a general 10-pole 9-slot synchronous motor, the teeth are provided at equiangular intervals, and when the tip widths θ1 and θ2 of the teeth of each phase are equal to each other, each of these tip widths θ1 and θ2 of the teeth of each phase is 360°/9=40°. The calculation result of the winding factor Kw in this case becomes 0.9452 as illustrated in FIG. 5.

As illustrated in FIG. 5 and FIG. 6, the winding factor Kw gradually increases as the tip width θ1 of the central tooth of each phase decreases from 40° and becomes the largest when the tip width θ1 of the central tooth of each phase is 36° (θ2 is 42°), which is 0.9553 as illustrated in FIG. 5.

The winding factor Kw gradually decreases as the tip width θ1 of the central tooth of each phase decreases from the tip width θ1 (36°) of the central tooth of each phase with which the winding factor Kw becomes the largest. When the tip width θ1 of the central tooth of each phase is 32° (θ2 is 44°), the winding factor Kw becomes equal to the calculation result of the winding factor Kw obtained when the tip widths θ1 and θ2 of the teeth of each phase are equal to each other, i.e., 40°, which is 0.9452 as illustrated in FIG. 5.

That is, when the tip width θ1 of the central tooth of each phase satisfies 32°<θ1<40°, the winding factor Kw becomes larger than that of the general 10-pole 9-slot synchronous motor in which the teeth are provided at equiangular intervals and the tip widths θ1 and θ2 of the teeth of each phase are equal to each other. The winding factor ratio obtained according to the above equation (4) approximately matches the induced voltage ratio obtained by the magnetic field analysis, as illustrated in FIG. 6. When the tip width θ1 of the central tooth of each phase is 36°, the induced voltage increases by up to about 1%.

Therefore, according to the present embodiment, the synchronous motor is configured such that the tip width θ1 of the central tooth 2a of each phase among the teeth 2a, 2b, and 2c of each phase satisfies 32°<θ1<40°. Accordingly, an induced voltage larger than that of the general 10-pole 9-slot synchronous motor can be acquired. Therefore, when a current equivalent to that of the general 10-pole 9-slot synchronous motor is carried, higher torque can be acquired and thus high output can be achieved.

Furthermore, torque equivalent to that of the general 10-pole 9-slot synchronous motor can be acquired by carrying a current less than that of the general 10-pole 9-slot synchronous motor; therefore, high efficiency can be achieved.

More preferably, by setting the tip width θ1 of the central tooth 2a of each phase among the teeth 2a, 2b, and 2c of each phase to be approximately 36°, it is possible to acquire an induced voltage larger than that of the general 10-pole 9-slot synchronous motor by up to about 1%. Consequently, higher output and higher efficiency can be achieved.

As can be understood from the calculation result of the winding factor illustrated in FIG. 5, the winding factor Kw1 of the stator winding wound around the central tooth of each phase indicates a higher value than the winding factor Kw2 of the stator windings wound around the teeth at both ends of each phase. If the widths of the portions of the respective teeth around which the stator windings are wound are made non-uniform in accordance with the tip widths of the respective teeth and if the portions of the teeth at both ends of each phase around which the stator windings are wound are brought closer to the central tooth of each phase, the sectional area of the slot between the central tooth of each phase and the teeth at both ends of each phase decreases and the amount of the stator winding that can be accommodated in the slot decreases. Accordingly, the performance of the synchronous motor cannot be sufficiently achieved. Further, even if the sectional area of the slot between the respective phases increases, only a space that does not accommodate therein the winding increases, and the sectional area of the stator 1 cannot be effectively utilized. In addition, if the number of windings of the stator winding wound around the central tooth of each phase having a high winding factor Kw1 is reduced, a decrease of the induced voltage increases, which is not effective.

As described above, there is a phase difference between the induced voltages generated in the stator windings wound around the respective teeth of each phase. In the present embodiment, the teeth 2a, 2b, and 2c are provided at equiangular intervals and the tip widths of the teeth 2b and 2c at both ends of each phase are set to be the same θ2. Accordingly, harmonic components, which serve as distortions included in the induced voltages generated in the stator windings wound around the respective teeth, cancel out each other, and as a result, low distortion of the induced voltage can be achieved. As means for further increasing the winding factor Kw, if the size of the slot openings between the respective phases is increased and all the tip widths of the respective teeth are approximated to 36°, theoretically, the largest winding factor can be acquired (the distributed winding factor can be set to 1). However, in this case, there is no phase difference between the induced voltages of the stator windings wound around the respective teeth. Therefore, the harmonic components are not canceled, and a large distortion may be generated in the induced voltage of each phase. Therefore, it is desirable to set the widths of all the slot openings between the respective phases and between the respective teeth to be approximately the same, to maintain the state where there is a phase difference between the induced voltages generated in the stator windings wound around the respective teeth of the respective phases.

If the slot opening between the respective phases increases, cogging torque also increases; therefore, vibrations and noise of the synchronous motor increase, which is not preferable.

As described above, according to the synchronous motor of the embodiment, in the 10-pole 9-slot synchronous motor, by configuring the synchronous motor such that the tip width θ1 of the central tooth of each phase among the teeth of each phase grouped into three phases, with each phase including three adjacent teeth, satisfies 32°<θ1<40°, an induced voltage larger than that of the general 10-pole 9-slot synchronous motor can be acquired. Therefore, when a current equivalent to that of the general 10-pole 9-slot synchronous motor is carried, higher torque can be acquired and thus high output can be achieved.

Furthermore, torque equivalent to that of the general 10-pole 9-slot synchronous motor can be acquired by carrying a current less than that of the general 10-pole 9-slot synchronous motor; therefore, high efficiency can be achieved.

More preferably, by setting the tip width θ1 of the central tooth of each phase among the teeth of each phase to be approximately 36°, it is possible to acquire an induced voltage larger than that of the general 10-pole 9-slot synchronous motor by up to about 1%. Consequently, higher output and higher efficiency can be achieved.

By providing the teeth at equiangular intervals and by setting the tip widths of the teeth at both ends of each phase to be the same θ2 and setting the width of all the slot openings between the teeth to be approximately the same, harmonic components included in the induced voltages, in which there is a phase difference and which are generated in the stator windings wound around the respective teeth, cancel out each other; therefore, low distortion of the induced voltage can be achieved. Further, by reducing the size of the slot openings between the respective phases, generation of cogging torque can be suppressed; therefore, low vibrations and low noise can be achieved.

The configuration described in the above embodiment is only an example of the configuration of the present invention. The configuration can be combined with other well-known techniques, and it is obvious that the present invention can be configured while modifying it without departing from the scope of the invention, such as omitting a part of the configuration.

INDUSTRIAL APPLICABILITY

As described above, the synchronous motor according to the present invention is useful as a three-phase synchronous motor using permanent magnets and is particularly suitable as a 10-pole 9-slot synchronous motor.

The invention claimed is:

1. A synchronous motor comprising:
a stator in which nine teeth are formed on an annular iron core centering on a shaft center at an equiangular interval in a circumferential direction, the teeth extending toward the shaft center; and
a rotor in which permanent magnets having 10 poles are provided on an outer periphery centering on the shaft center at an equiangular interval in a circumferential direction, with magnetic poles with different polarities being alternately provided, the rotor being arranged on an inner side of the stator to face the stator, wherein
three adjacent teeth of the nine teeth constitute one phase,
stator windings are wound continuously in a concentrated manner around the teeth for one phase, with winding directions of the stator windings of each phase being opposite to each other between adjacent teeth as viewed from the shaft center, and
an angle of a tip portion of a central tooth, which faces the rotor, among the three teeth of each phase is larger than 32° and smaller than 40° and is smaller than an angle of teeth at both ends of each phase.

2. The synchronous motor according to claim 1, wherein the angle of the tip portion of the central tooth of each phase among the nine teeth is approximately 36°.

3. The synchronous motor according to claim 1, wherein angles of tip portions of the teeth at both ends of each phase among the nine teeth are the same.

4. The synchronous motor according to claim 3, wherein an angle of a slot opening between the teeth is approximately the same.

* * * * *